US011455535B2

(12) United States Patent
Afifi et al.

(10) Patent No.: US 11,455,535 B2
(45) Date of Patent: Sep. 27, 2022

(54) SYSTEMS AND METHODS FOR SENSOR-INDEPENDENT ILLUMINANT DETERMINATION

(71) Applicants: Mahmoud Afifi, North York (CA); Michael Brown, Toronto (CA)

(72) Inventors: Mahmoud Afifi, North York (CA); Michael Brown, Toronto (CA)

(*) Notice: Subject to any disclaimer, the term of this patent is extended or adjusted under 35 U.S.C. 154(b) by 181 days.

(21) Appl. No.: 16/993,841

(22) Filed: Aug. 14, 2020

(65) Prior Publication Data

US 2021/0058596 A1   Feb. 25, 2021

Related U.S. Application Data

(60) Provisional application No. 62/890,135, filed on Aug. 22, 2019.

(51) Int. Cl.

| *G06T 7/90* | (2017.01) |
| *H04N 9/77* | (2006.01) |
| *H04N 9/73* | (2006.01) |
| *G06N 3/08* | (2006.01) |
| *G06N 3/04* | (2006.01) |

(52) U.S. Cl.
CPC .............. *G06N 3/08* (2013.01); *G06N 3/0454* (2013.01); *G06T 7/90* (2017.01); *G06T 2207/10024* (2013.01); *G06T 2207/20081* (2013.01); *G06T 2207/20084* (2013.01); *H04N 9/73* (2013.01); *H04N 9/77* (2013.01)

(58) Field of Classification Search
CPC .......... G06N 3/08; G06N 3/0454; G06T 7/90; G06T 2207/10024; G06T 2207/20081; G06T 2207/20084; H04N 9/73; H04N 9/735
See application file for complete search history.

(56) References Cited

U.S. PATENT DOCUMENTS

| 2015/0326842 | A1* | 11/2015 | Huai | ........................ H04N 9/73 |
| | | | | 348/223.1 |
| 2020/0051225 | A1* | 2/2020 | Barron | ..................... G06T 7/90 |
| 2020/0413020 | A1* | 12/2020 | Huai | ..................... H04N 9/735 |

* cited by examiner

*Primary Examiner* — Christopher Wait
(74) *Attorney, Agent, or Firm* — Bhole IP Law; Anil Bhole; Marc Lampert

(57) ABSTRACT

Systems and methods for sensor-independent illuminant determination are provided. In one embodiment of the method, the method includes receiving one or more training images in raw-RGB format; generating an input histogram from each of the inputted raw images; generating a learned mapping matrix that map raw images to a learned mapping space by passing the one or more input histograms to a trained first machine learning model; generating one or more mapped images by applying the learned mapping matrix to the one or more training images; generating a mapped histogram from each of the mapped images; and determining the result illuminant by passing the one or more mapped histograms as input into a second machine learning model. A final illuminant for an input image can be determined by applying the result illuminant to the input color space of the input image.

18 Claims, 9 Drawing Sheets

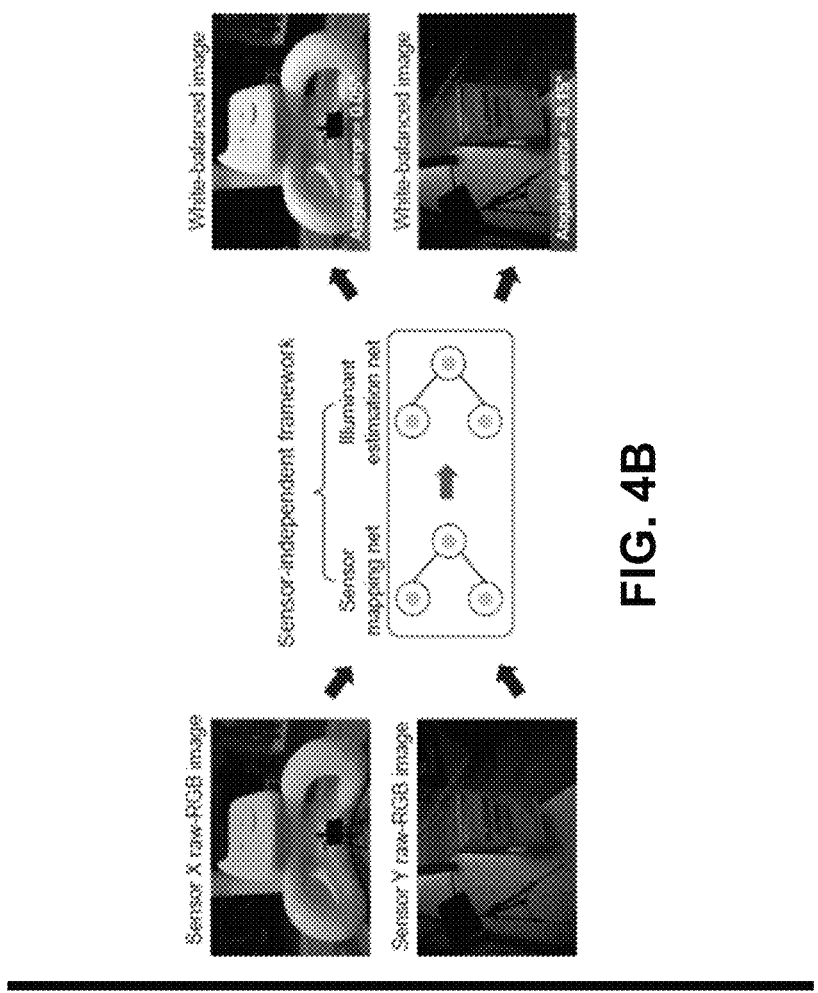
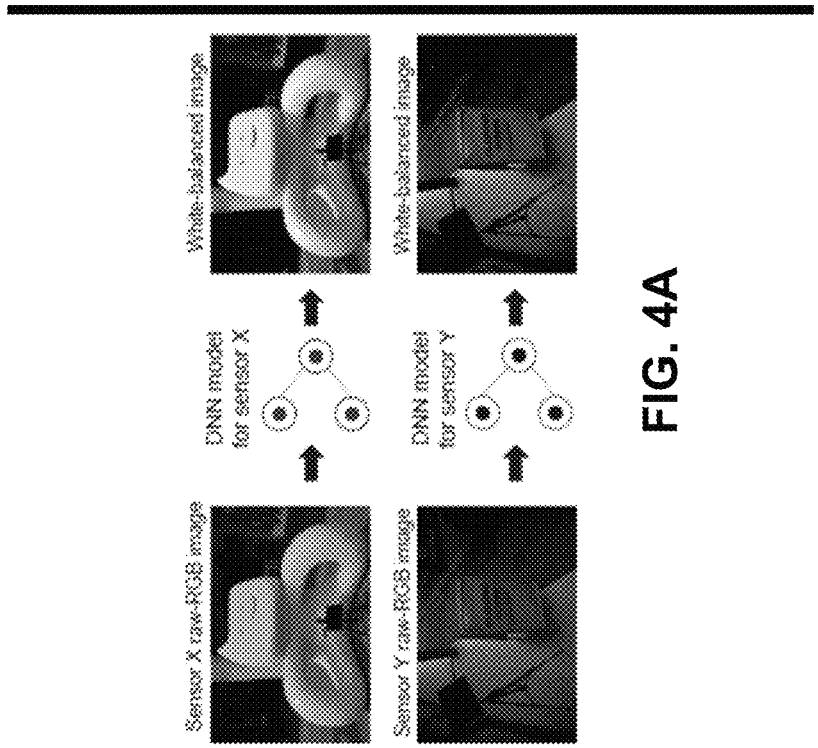
FIG. 4A
FIG. 4B

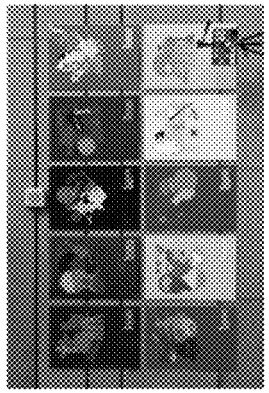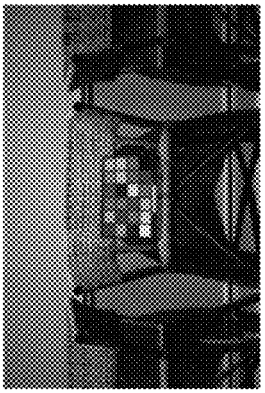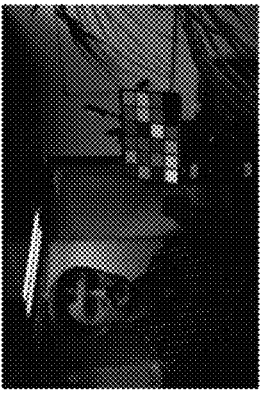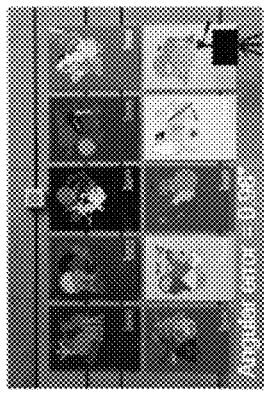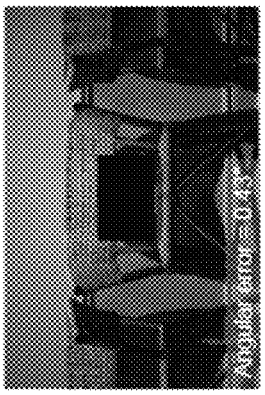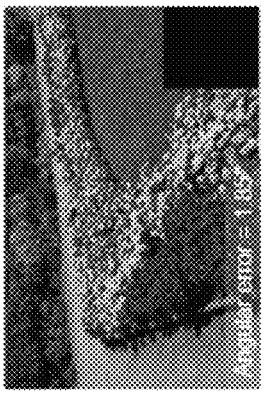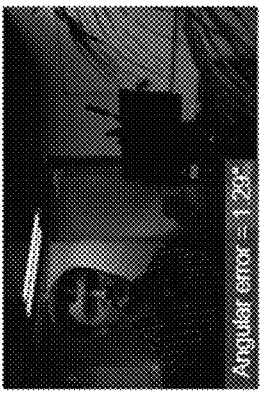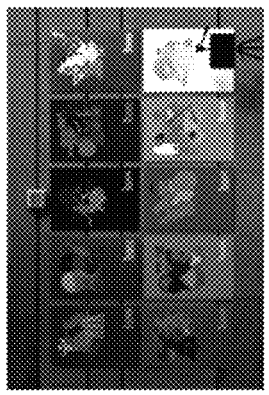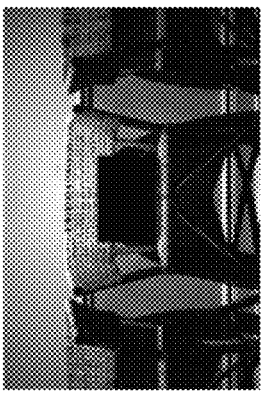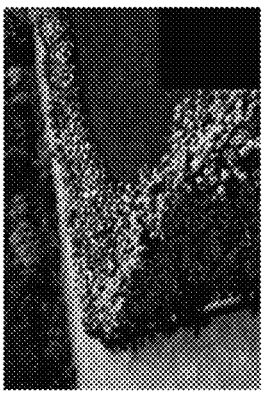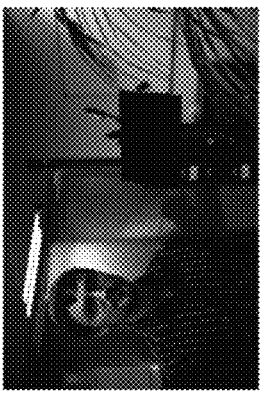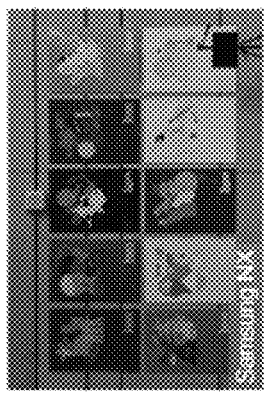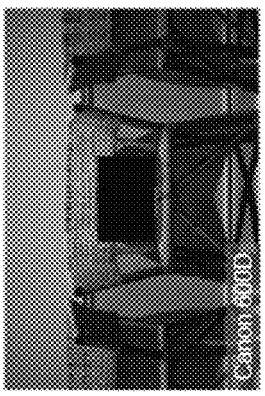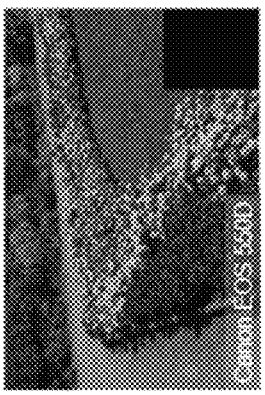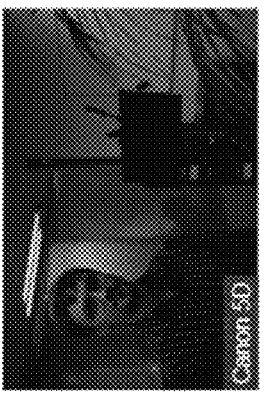
FIG. 7A   FIG. 7B   FIG. 7C   FIG. 7D

SYSTEMS AND METHODS FOR SENSOR-INDEPENDENT ILLUMINANT DETERMINATION

TECHNICAL FIELD

The following relates generally to digital image processing and more specifically to systems and methods for sensor-independent illuminant determination.

BACKGROUND

Digital cameras have a number of processing steps that convert the camera's raw Red, Green, Blue (RGB) responses to standard RGB outputs. An important step in this processing chain is white balance correction, which attempts to remove the effects of scene illumination. With respect to scene illumination, color constancy is the notion of constant appearance of object colors under different illumination conditions. Human vision has the illumination adaption ability to recognize the same object colors under different scene lighting. Camera sensors, however, do not have this ability and as a result, computational color constancy is required to be applied. In a photography context, this procedure is typically called white balance.

SUMMARY

In an aspect, there is provided a computer-implemented method for determining an illuminant for an input image, the method comprising: receiving the input image in raw-RGB format comprising an input color space; determining a final illuminant by applying a result illuminant to the input color space, the result illuminant having been determined from a learned mapping space; and outputting the final illuminant.

In a particular case of the method, the result illuminant having been determined from a sensor-independent color space, comprising: receiving a plurality of training images in raw-RGB format; generating the learned mapping space by passing a color distribution of each of the plurality of training images to a trained first machine learning model; generating a plurality mapped images by applying the learned mapping space to each of the plurality of training images; and determining the result illuminant by passing a color distribution of each of the plurality of mapped images as input into a second machine learning model.

In a further case of the method, the color distribution of each of the plurality of training images comprises an input histogram generated from the respective training image, and wherein the color distribution of each of the plurality of mapped images comprises a mapped histogram generated from the respective mapped image.

In a yet further case of the method, each of the input histograms and the mapped histograms comprise an RGB-uv histogram.

In a yet further case of the method, the RGB-uv histogram comprises a first learnable parameter to control contribution of each color channel and a second learnable parameter to control smoothness of histogram bins.

In a yet further case of the method, the learned mapping space is represented by a learnable 3×3 matrix and the result illuminant is represented by a vector.

In a yet further case of the method, the final illuminant is a vector determined as a multiplication of an inverse of the learnable matrix and the result illuminant.

In a yet further case of the method, the first learning model and the second learning model comprise a convolutional neural network comprising three convolutional (conv) and rectified linear units (ReLU) layers followed by a fully connected (FC) layer.

In a yet further case of the method, the first learning model and the second learning model are jointly trained in an end-to-end manner using an adaptive moment estimation (Adam) optimizer.

In a yet further case of the method, the first machine learning model and the second machine learning model use a recovery angular error between a ground truth illuminant for and the result illuminant as a loss function.

In another aspect, there is provided a computer-implemented method for determining a sensor-independent result illuminant, comprising: receiving a plurality of training images in raw-RGB format; generating the learned mapping space by passing a color distribution of each of the plurality of training images to a trained first machine learning model; generating a plurality mapped images by applying the learned mapping space to each of the plurality of training images; determining the result illuminant by passing a color distribution of each of the plurality of mapped images as input into a second machine learning model; and outputting the result illuminant.

In another aspect, there is provided a system for determining an illuminant for an input image, the system comprising one or more processors and a data storage, the one or more processors in communication with the data storage device and configured to execute: an input module to receive the input image in raw-RGB format comprising an input color space; a final illuminant module to determine a final illuminant by applying a result illuminant to the input color space, the result illuminant having been determined from a learned mapping space; and an output module to output the final illuminant.

In a particular case of the system, the result illuminant having been determined from a sensor-independent color space, comprising the one or more processors further configured to execute: a sensor mapping module to generate the learned mapping space by passing a color distribution of each of a plurality of training images received by the input module to a trained first machine learning model; and an illuminant determination module to determine the result illuminant by passing a color distribution of each of the plurality of mapped images as input into a second machine learning model, the mapped images generated by applying the learned mapping space to each of the plurality of training images.

In a further case of the system, the system further comprising a histogram module to generate an input histogram as the color distribution of each of the plurality of training images, and to generate a mapped histogram as the color distribution of each of the plurality of training images.

In a yet further case of the system, each of the input histograms and the mapped histograms comprise an RGB-uv histogram.

In a yet further case of the system, the learned mapping space is represented by a learnable 3×3 matrix and the result illuminant is represented by a vector.

In a yet further case of the system, the final illuminant is a vector determined as a multiplication of an inverse of the learnable matrix and the result illuminant.

In a yet further case of the system, the first learning model and the second learning model comprise a convolutional neural network comprising three convolutional (conv) and rectified linear units (ReLU) layers followed by a fully connected (FC) layer.

In a yet further case of the system, the first learning model and the second learning model are jointly trained in an end-to-end manner using an adaptive moment estimation (Adam) optimizer.

In a yet further case of the system, the first machine learning model and the second machine learning model use a recovery angular error between a ground truth illuminant for and the result illuminant as a loss function.

These and other aspects are contemplated and described herein. It will be appreciated that the foregoing summary sets out representative aspects of systems and methods to assist skilled readers in understanding the following detailed description.

DESCRIPTION OF THE DRAWING

The patent or application file contains at least one drawing executed in color. Copies of this patent or patent application publication with color drawing(s) will be provided by the Office upon request and payment of the necessary fee.

The features of the invention will become more apparent in the following detailed description in which reference is made to the appended drawings wherein:

FIG. 4A shows diagram of an example of learning-based illuminant estimation approaches for training or fine-tuning a model per camera sensor.

FIG. 4B shows a diagram of an example of training on images captured by different camera sensors and generalizing for unseen camera sensors, in accordance with the system of FIG. 1;

FIG. 7A shows example input raw-RGB images for example experiments;

FIG. 7B shows the images of FIG. 7A after mapping the example images to a learned space;

FIG. 7C shows the images of FIG. 7A after correcting the images based on estimated illuminants; and FIG. 7D shows the images of FIG. 7A corrected by ground truth illuminants.

DETAILED DESCRIPTION

Figure 1:
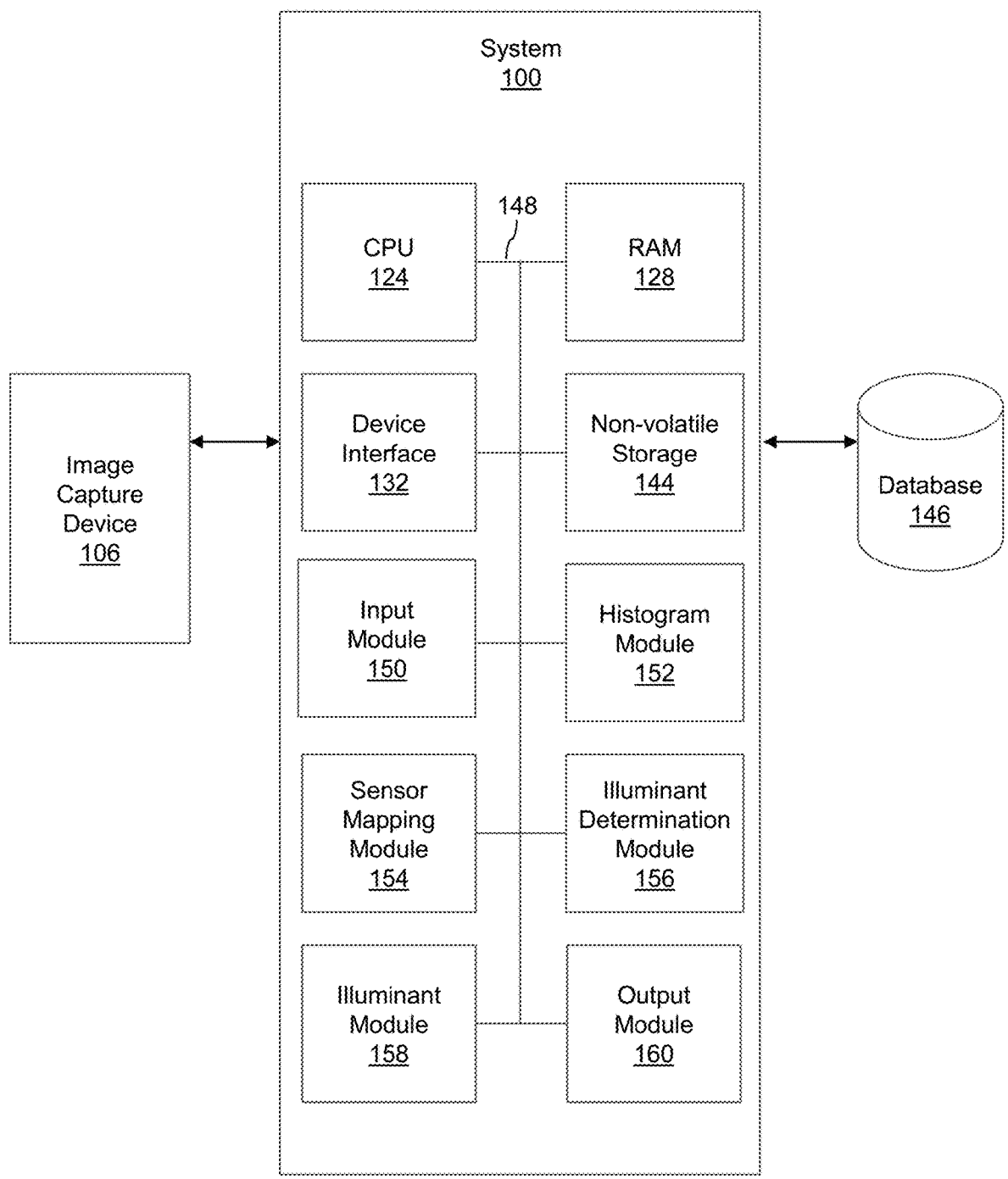
FIG. 1 is a block diagram illustrating a system for sensor-independent illuminant determination 100, in accordance with an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to digital image processing and more specifically to systems and methods for sensor-independent illuminant determination.

Color constancy is the constant appearance of object colors under different illumination conditions. Generally, determining color constancy (i.e., white balance) is performed onboard the camera, offloaded to a separate computing system, or performed in post-processing. A significant technical challenge for determining color constancy is estimating a camera sensor's RGB response to a scene's illumination. Illumination estimation, or auto white balance (AWB), is a fundamental procedure generally applied onboard cameras to ensure the correct interpretation of scene colors.

In an example, determining color constancy can be described in terms of the physical image formation process. Let $I=\{I_r, I_g, I_b\}$ denote an image captured in a linear raw-RGB space. The value of each color channel c={R, G, B} for a pixel located at x in I is given by the following equation:

$$I_c(x) = \int_\gamma \rho(x,\lambda) R(x,\lambda) S_c(\lambda) d\lambda, \quad (1)$$

where γ is the visible light spectrum (approximately 380 nm to 780 nm), ρ(·) is the illuminant spectral power distribution, R(·) is the captured scene's spectral reflectance properties, and S(·) is the camera sensor response function at wavelength λ.

The above Equation (1) can be simplified by assuming a single uniform illuminant in the scene as follows:

$$I_c = \ell_c \times R_c, \quad (2)$$

where $\ell_c$ is the scene illuminant value of color channel c (for example, either R=Red, G=Green, and B=Blue).

Figure 3:
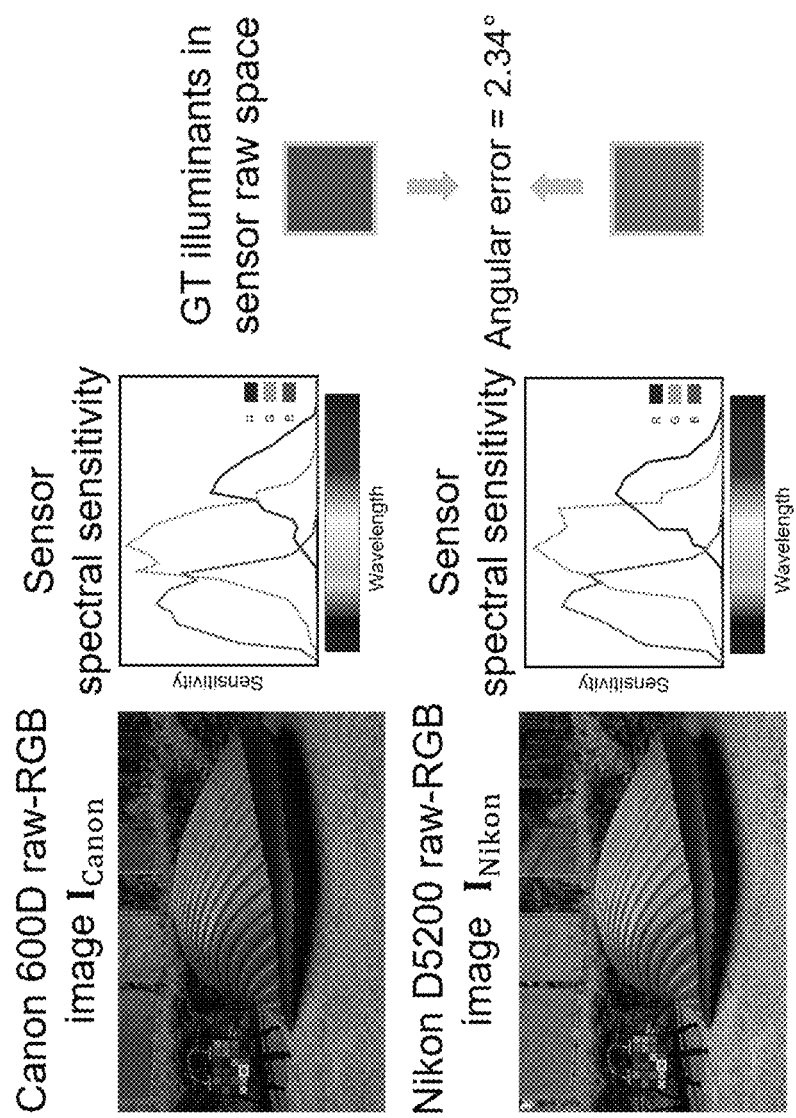
FIG. 3 shows a diagram of an example of a scene captured by two different camera sensors resulting in different ground truth illuminants due to different camera sensor responses.

An approach to the above Equation (2) is to use a linear model (i.e., a 3×3 diagonal matrix) such that $\ell_R = \ell_G = \ell_B$ (i.e., white illuminant). In many cases, $\ell$ is unknown and can be defined to obtain the true objects' body reflectance values R in the input image I. Generally, the value of $\ell$ is specific to the camera sensor response function S(·), meaning that the same scene captured by different camera sensors results in different values of $\ell$. FIG. 3 shows an example of a scene captured by two different camera sensors resulting in different ground truth illuminants due to different camera sensor responses. Advantageously, the present embodiments address this substantial technical challenge by learning a device-independent learned space that reduces the difference between ground truth illuminants of the same scenes.

Illuminant estimation approaches generally aim to estimate the value $\ell$ from the sensor's raw-RGB image. Some approaches use deep neural network (DNN) methods to address the illuminant estimation task. These approaches, however, are substantially inefficient and have a significant drawback in that they need to train the DNN model per camera sensor. When a camera manufacturer decides to use a new sensor, the DNN model will need to be retrained on a new image dataset captured by the new sensor. Collecting such datasets with the corresponding ground-truth illuminant raw-RGB values is a substantially tedious process. As a result, many AWB approaches deployed on cameras still rely on simple statistical-based approaches, even though such approaches have substantially reduced accuracy in comparison to those obtained by machine learning-based approaches.

Illuminant estimation is a vital part of a camera's AWB function. Illuminant estimation aims to estimate an illumination in an imaged scene directly from a raw-RGB image without a known achromatic reference scene patch. Sensor-independent approaches for illumination estimation generally operate using statistics from an image's color distribution and spatial layout to estimate the scene illuminant. Such statistical-based approaches include: Gray-World, White-Patch, Shades-of-Gray, Gray-Edges, and PCA-based Bright-and-Dark Colors. These approaches are fast and easy to implement; however, their accuracy is generally substantially unsatisfactory. Sensor-dependent approaches generally use machine learning-based approaches, which generally outperform statistical-based approaches. Sensor-dependent approaches generally train sensor-specific models on training examples provided with the labeled images with ground-truth illumination obtained from physical charts placed in the scene with achromatic reference patches. These training images are captured to train specifically for a given sensor make and model. Sensor-dependent approaches can include, for example, Bayesian-based methods, gamut-based methods, exemplar-based methods, bias-correction methods, and deep neural network (DNN). However, these approaches do not generalize well for arbitrary camera sensors without retraining and/or fine-tuning on samples captured by testing of the camera sensor. The present embodiments, advantageously, are intended to be sensor-independent and generalize well for unseen camera sensors without the need to retrain and/or tune a model.

The image processing pipeline of a camera generally includes mapping of camera raw-RGB sensor responses to a perceptual color space. This process is generally applied onboard digital cameras to map the captured sensor-specific raw-RGB image to a standard device-independent "canonical" space (for example, CIE XYZ). Typically, this conversion is performed using a 3×3 matrix and requires an accurate estimation of the scene illuminant. Accordingly, this mapping to CIE XYZ requires that white-balance procedure first be applied. As a result, it is generally not possible to use CIE XYZ as the canonical color space to perform illumination estimation. Several transformations can be used to map responses from a source camera sensor to a target camera sensor, instead of mapping to a perceptual space. In these cases, a color rendition reference chart is captured by both source and target camera sensors in order to compute the raw-to-raw mapping function. However, importantly, such approaches do not have a mechanism to map an unseen sensor to a canonical learned space without explicit calibration.

In the present embodiments, a sensor-independent learning approach for illuminant estimation is advantageously provided. In embodiments described herein, the system can learn a color space before an illuminant estimation step is performed in the camera image processing pipeline. In some cases, an unsupervised deep learning framework is provided that learns how to map each input image, captured by arbitrary camera sensor, to a non-perceptual sensor-independent learned space. Mapping input images to this space allows the system to train the machine learning model using training sets captured by different camera sensors; advantageously achieving substantial accuracy and having the ability to generalize for unseen camera sensors. FIG. 4A shows an example of learning-based illuminant estimation approaches for training or fine-tuning a model per camera sensor. FIG. 4B shows an example of the present embodiments for training on images captured by different camera sensors and generalizing substantially well for unseen camera sensors. The images shown in FIGS. 4A and 4B were rendered in the sRGB color space by the camera imaging pipeline to aid visualization.

Referring to FIG. 1, a diagram of a system for sensor-independent illuminant determination 100, in accordance with an embodiment, is shown. The system 100 can include a number of physical and logical components, including central processing unit ("CPU") 124, random access memory ("RAM") 128, an input interface 132, an output interface 136, memory comprising non-volatile storage 144, and a local bus 148 enabling CPU 124 to communicate with the other components. CPU 124 can include one or more processors. RAM 128 provides relatively responsive volatile storage to CPU 124. The device interface 132 allows the system 100 to communicate and interact with external devices. For examples, the device interface 132 enables a user to provide input with an input device, for example, a touchscreen. The device interface 132 also enables outputting of information to output devices, for example, to the touchscreen. The device interface 132 can also provide an interface for communicating with external imaging devices, such as a camera or video camera. Non-volatile storage 144 can store computer-executable instructions for implementing the system 100, as well as any derivative or other data. In some cases, this data can be stored or synced with a database 146, that can be local to the system 100 or remotely located (for example, a centralized server or cloud repository). During operation of the system 100, data may be retrieved from the non-volatile storage 144 and placed in RAM 128 to facilitate execution. In an embodiment, the CPU 124 can be configured to execute various modules; in a particular case, an input module 150, a histogram module 152, a sensor mapping module 154, an illuminant determination module 156, a final illuminant module 158, and an output module 160.

In an embodiment, the system 100 can be located on, or be a part of, the image capture device 106; such as a camera or smartphone. In this case, the system can be implemented, for example, with general or specialized computing components, or with a system-on-chip (SoC) implementation. In other cases, the system 100 can be located on a computing device that is separate or remote from the image capture device 106. In this case, the system 100 may be any type of computing device, such as a mobile phone, a desktop or a laptop computer, a digital media player, server, or the like, that is capable of acquiring and processing image data. In some cases, the system 100 can apply the approach of the present embodiments to images received from the image capture device 106, and in other cases, can apply such approaches to image data stored in the database 146. In some cases, the system 100 may receive the image from a network, for example, the Internet.

Figure 2:
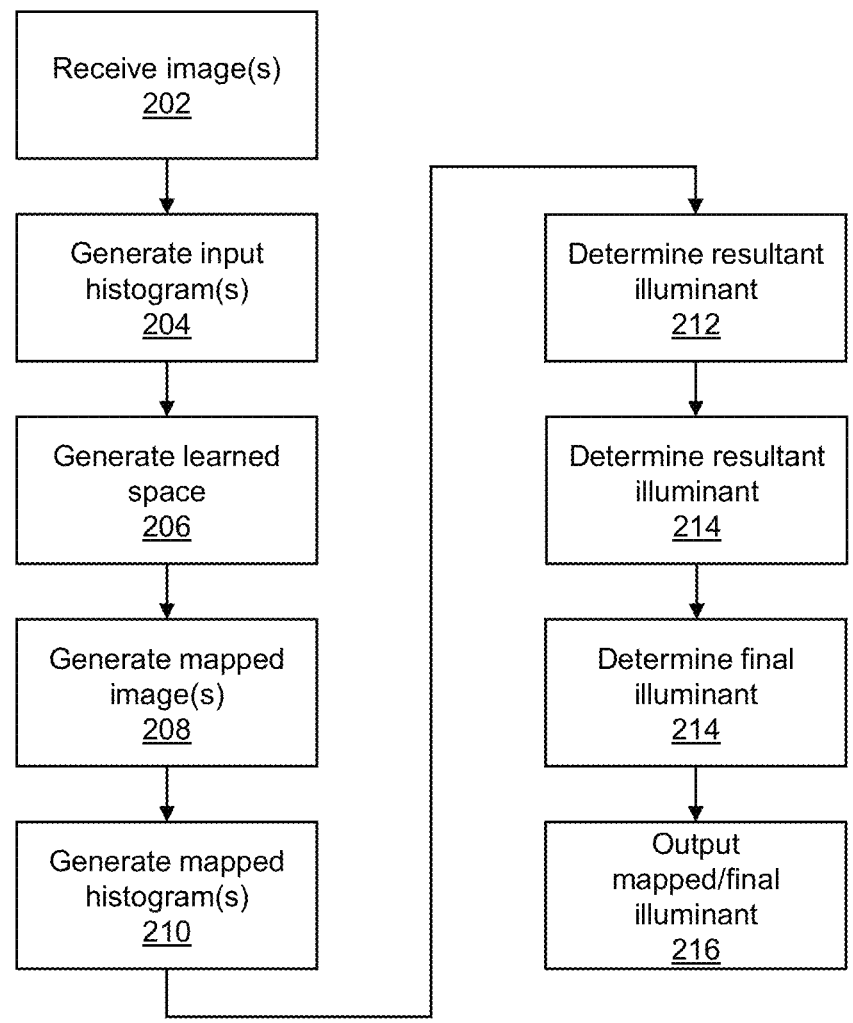
FIG. 2 is a flow diagram illustrating a method for sensor-independent illuminant determination 100, in accordance with an embodiment.

FIG. 2 shows a flowchart for a method for sensor-independent illuminant determination 200, in accordance with an embodiment. At block 202, the input module 150 receives one or more raw-RGB digital images, I, from one or more image sensors on one or more image capture devices 106, via the device interface 132. In some cases, the received digital images can be thumbnail-sized images; for example, a 150×150 pixels linear raw-RGB image.

At block 204, the histogram module 152 generates an input histogram from each of the inputted raw images. The input histogram represents an image color distribution. In a particular case, the histogram can be an RGB-uv histogram that represents an image color distribution in a log of chromaticity space. In some cases, the RGB-uv histogram can be represented as an m×m×3 tensor.

At block 206, the sensor mapping module 154 passes the one or more input histograms as input into a first machine learning model to generate a learned space represented by a learned mapping matrix, $\mathcal{M}$.

At block 208, the sensor mapping module 154 generates one or more mapped images, $I_m = \mathcal{M} I$, in the learned space by applying the learned mapping matrix to the one or more raw-RGB input images.

At block 210, the histogram module 152 generates a mapped histogram from each of the mapped images, which represents the image color distribution of that mapped image. Similar to above, in a particular case, the histogram can be an RGB-uv histogram that represents an image color distribution in a log of chromaticity space. In some cases, the RGB-uv histogram can be represented as an m×m×3 tensor.

At block 212, the illuminant determination module 156 determines a result illuminant, represented by an illuminant vector $\ell_m$, which represents scene illumination values of the mapped image in a working color space. The illuminant determination module 156 determines the result illuminant by passing the one or more mapped histograms as input into a second machine learning model.

At block 214, the input module 150 can receive a further raw-RGB digital images (or received in block 202) and the final illuminant module 158 can determine a final illuminant for such input image by mapping the result illuminant from the learned space to the input image's camera-specific raw space. For example, by multiplying an inverse of the learned mapping matrix by the illuminant vector. In some cases, block 214 can be performed on a separate computing device from the previous blocks after having received the mapped illuminant.

As the learned illuminant vector in the training space generally cannot directly be applied to the raw-RGB image in the camera-specific raw space, due to likely being different spaces, block 214 allows the learned illuminant to be mapped back to the input image's original sensor-specific raw-RGB space. Mapping back to the camera-specific raw space advantageously allows the present embodiments to be used in existing camera pipelines, which include different stages after white balancing. Such camera pipelines generally expect to receive the white-balanced image in the raw space in order to convert it to a canonical space (e.g., CIE XYZ) followed by color rendering modules that generate the final sRGB image. For that reason, the present embodiments can perform white balancing of the image in its original space.

The training space is learned by the system 100 during training of the machine learning models. In order to train the models, in most cases, the system 100 uses ground truth illuminants for both sensor mapping and illuminant estimation. Generally, the ground truth illuminants cannot be obtained up front in the training space because the system 100 does not know the training space without training. Thus, the system 100 uses the ground truth vectors obtained in an original sensor-specific raw-RGB space for each image. Each illuminant vector obtained from the second machine learning model can then be inverted to map it back to its original space. After mapping, each illuminant vector can be compared against the respective ground truth illuminant to determine loss and train the models.

At block 216, the output module 160 outputs the mapped illuminant, the final illuminant, and/or a white balanced image using the final illuminant. In an example, white balance correction can be determined using on a 3×3 diagonal matrix, which is determined based on the final illuminant vector. This diagonal matrix has three diagonal parameters, each of which can be multiplied by a corresponding color channel of the raw image to remove the illuminant effect.

Figure 5:
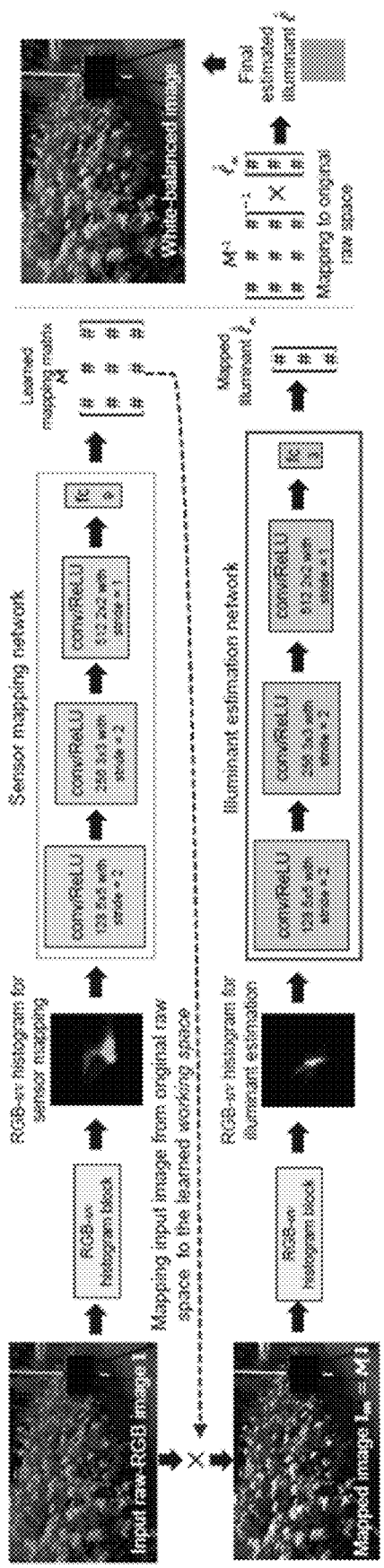
FIG. 5 shows a diagram of an example implementation of determining an illuminant, in accordance with the method of FIG. 2.

FIG. 5 shows a diagram of an example implementation of the method 200. As shown, this example of the method 200 uses two machine learning models; in this example: (i) a first machine learning model comprising a sensor mapping network and (ii) a second machine learning model comprising an illuminant estimation network. These two networks can be trained jointly in an end-to-end manner to learn an image-specific mapping matrix (resulting from the sensor mapping network) and scene illuminant in the learned space (resulting from the illuminant estimation network). A final estimated illuminant can be produced by mapping the result illuminant from the learned space to the input image's camera-specific raw space. In some cases, for both the first machine learning model and the second machine learning model, ground-truth data for training of the model can comprise labeled training raw images with ground-truth illuminant obtained from physical charts placed in the scene with achromatic reference patches.

Advantageously, the ground truth data used for training can be sensor agnostic and received from different image sensors. In some cases, the training images contain a calibration object (e.g., color charts) placed in the captured scene. This calibration object has known achromatic regions or patches (for example, patches that have R=G=B). By measuring the R,G,B values of these known achromatic patches, the system 100 can measure the scene illuminant; as these patches should completely reflect the scene illuminant values. In the example experiments described herein, the present inventors used different illuminant estimation datasets that contained different raw RGB-images taken by different sensor models. Each image contained a calibration object and was associated with a ground truth value obtained by measuring the RGB value of the known achromatic patches of the calibration object. This measurement can be taken from, for example, a single sample (single pixel) from the achromatic patch, from an average of all achromatic patch pixels, from a median value of all achromatic patch pixels, or the like.

In the example of FIG. 5, the system 100 receives thumbnail representation (for example, 150×150 pixels) linear raw-RGB images, captured by an arbitrary camera sensor, and can estimate scene illuminant RGB vectors in the same space of input images. In further cases, the input image can be received in its original size or any other suitable size in consideration of the computing and storage requirements of the system. Color distribution of the input thumbnail image I can be used to estimate an image-specific transformation matrix that maps the input image to a sensor-independent learned space. This mapping allows the system 100 to accept images captured by different sensors and estimate scene illuminant values in the original space of input images. In the example of FIG. 5, as described below, it is assumed that input raw-RGB images are represented as 3×n matrices, where n=150×150 is the total number of pixels in the thumbnail image and the three rows represent the R, G, and B values.

The system 100 uses a learned space for illumination estimation that is sensor-independent and retains the linear property of an original raw-RGB space. To that end, the system 100 uses a learnable 3×3 matrix $\mathcal{M}$ that maps an input image I from its original sensor-specific space to the learned space. Equation (2) is reformulated as follows:

$$\mathcal{M}^{-1}\mathcal{M} I = \text{diag}(\mathcal{M}^{-1}\mathcal{M} \ell)R, \quad (3)$$

where diag(·) is a diagonal matrix and $\mathcal{M}$ is a learned matrix that maps arbitrary sensor responses to the sensor-independent learned space.

Given a mapped image $I_m = \mathcal{M} I$ in the learned space, the system 100 can estimate a mapped vector $\ell_m = \mathcal{M} \ell$ that represents scene illuminant values of $I_m$ in a learned color space. The learned color space is a space that the first machine learning model learns to map each image into in order to improve the illuminant estimation performed by the second machine learning model The original scene illuminant (represented in the original sensor raw-RGB space) can be reconstructed by the following equation:

$$\ell = \mathcal{M}^{-1} \ell_m. \quad (4)$$

As the illumination estimation problem can be highly related to the image's color distribution, the system 100 can use the image's color distribution as an input. Representing the image using a full three-dimensional (3D) RGB histogram can require a significant amount of memory; for example, a $256^3$ RGB histogram requires more than 16 million entries. Even down-sampling the histogram, for example to 64-bins, can still require a considerable amount of memory. Instead, the system 100 uses an RGB-uv histogram that represents an image color distribution in the log of chromaticity space. When the R,G,B values are projected to the log space ($2^{nd}$, $3^{rd}$, and $4^{th}$ equations in Equation (5) below), the u1v1, u2v2, u3v3 are used to refer to that space. The system 100 can use two learnable parameters to control the contribution of each color channel in the generated histogram and the smoothness of histogram bins. Specifically, the RGB-uv histogram block represents the color distribution of an image I as a three-layer histogram H(I), which can be represented as an m×m×3 tensor. The produced histogram H(I) can be parameterized by uv such that the histogram can be described by u and v values. The learning space can thus be bounded by m x m x 3 bins and u and v values can be used to access any value of it. The histogram can be determined as follows:

$$I_y(i) = \sqrt{I_{R(i)}^2 + I_{G(i)}^2 + I_{B(i)}^2}, \quad (5)$$

$$I_{u1(i)} = \log\left(\frac{I_{R(i)}}{I_{G(i)}} + \epsilon\right), I_{v1(i)} = \log\left(\frac{I_{R(i)}}{I_{B(i)}} + \epsilon\right),$$

$$I_{u2(i)} = \log\left(\frac{I_{G(i)}}{I_{R(i)}} + \epsilon\right), I_{v2(i)} = \log\left(\frac{I_{G(i)}}{I_{B(i)}} + \epsilon\right),$$

$$I_{u3(i)} = \log\left(\frac{I_{B(i)}}{I_{R(i)}} + \epsilon\right), I_{v3(i)} = \log\left(\frac{I_{B(i)}}{I_{G(i)}} + \epsilon\right),$$

$$H(I)_{(u,v,c)} = \left(s_c \sum_i I_{y(i)} \exp(-|I_{uc(i)} - u|/\sigma_c^2)\exp(-|I_{vc(i)} - v|/\sigma_c^2)\right)^{\frac{1}{2}},$$

where i={1, . . . , n}, c∈{1, 2, 3} represents each color channel in H, ϵ is a small positive constant added for numerical stability, and $s_c$ and $\sigma_c$ are learnable scale and fall-off parameters, respectively. The scale factor $s_c$ controls the contribution of each layer in our histogram, while the fall-off factor $\sigma_c$ controls the smoothness of the histogram's bins of each layer. The values of these parameters (i.e., $s_c$ and $\sigma_c$) are learned during training of the machine learning model.

While the present embodiments describe using a histogram as input to each of the machine learning models, it is understood that in other embodiments, the models can receive as input the image data itself without generating the histogram, or other features based on image color distribution.

As exemplified in FIG. 5, the system 100 can use two machine learning models: (i) a first machine learning model for sensor mapping and (ii) a second machine learning model for illuminant estimation. The input to each network is the RGB-uv histogram feature. The first machine learning model can take as input an RGB-uv histogram of a thumbnail raw-RGB image I in its original sensor space. The second machine learning model can take as input RGB-uv histograms of the mapped image $I_m$ to a learned space. In an example implementation, the system 100 can use m=61 and each histogram feature can be represented by a 61×61×3 tensor.

In an embodiment, each of the two machine learning models can be a deep learning convolutional neural network comprising three convolutional (conv) and rectified linear units (ReLU) layers followed by a fully connected (FC)

layer. The kernel size and stride step used in each cony layer are illustrated in FIG. 5. It is understood that any suitable machine learning model, having any suitable architecture, can be used for the first and second machine learning models (which can be respectively different); for example, a recurrent neural network (RNN) model, a random forest model, or the like.

In an example architecture, the first machine learning model can have a last FC layer that has nine neurons. The output vector v of this FC layer can be reshaped to construct a 3×3 matrix V, which can be used to build $\mathcal{M}$ as exemplified in the following equation:

$$\mathcal{M} = \frac{1}{\|V\| + \epsilon}|V|, \quad (6)$$

where $|\cdot|$ is the modulus (absolute magnitude), $\|\cdot\|_1$ is the matrix 1-norm, and $\epsilon$ is added for numerical stability.

The modulus in Equation (6) can be used to avoid negative values in the mapped image $I_m$, while the normalization can be used to avoid having extremely large values in $I_m$. Note the values of $\mathcal{M}$ are generally image-specific, meaning that its values are produced based on the input image's color distribution in the original raw-RGB space.

In an example architecture, the second machine learning model can have a last FC layer that has three neurons. This last layer can be used to produce illuminant vector $\hat{\ell}_m$ of the mapped image $I_m$. Note that the estimated vector $\hat{\ell}_m$ represents a scene illuminant in the learned space.

The output of the system 100 can be obtained by mapping $\hat{\ell}_m$ back to the original space of I using Equation (4).

In an embodiment, the first machine learning model and the second machine learning model can be jointly trained in an end-to-end manner using, for example, an adaptive moment estimation (Adam) optimizer. In an example, the optimizer can have a decay rate of gradient moving average $\beta_1=0.85$, a decay rate of squared gradient moving average $\beta_2=0.99$, and a mini-batch with eight observations at each iteration. Both models can be initialized with network weights using, for example, Xavier initialization. In an example, the learning rate can be set to $10^{-5}$ and decayed every five epochs.

In an example embodiment, a loss function for the two machine learning models can be a recovery angular error (referred to as an angular error). The angular error is determined between the ground truth illuminant $\ell$ and the illuminant $\hat{\ell}_m$ estimated by the system 100 after mapping it to the original raw-RGB space of training image I. The loss function can be described by the following equation:

$$L(\hat{\ell}_m, \mathcal{M}) = \cos^{-1}\left(\frac{\ell \cdot (\mathcal{M}^{-1}\hat{\ell}_m)}{\|\ell\| \|\mathcal{M}^{-1}\hat{\ell}_m\|}\right), \quad (7)$$

where $\|\cdot\|$ is the Euclidean norm, and $(\cdot)$ is the vector dot-product.

As the values of $\mathcal{M}$ are produced by the first machine learning model, there is a possibility of producing a singular matrix output. In this case, a small offset $\mathcal{N}(0,1) \times 10^{-4}$ can be added to each parameter in $\mathcal{M}$ to make it invertible.

Figure 6A:
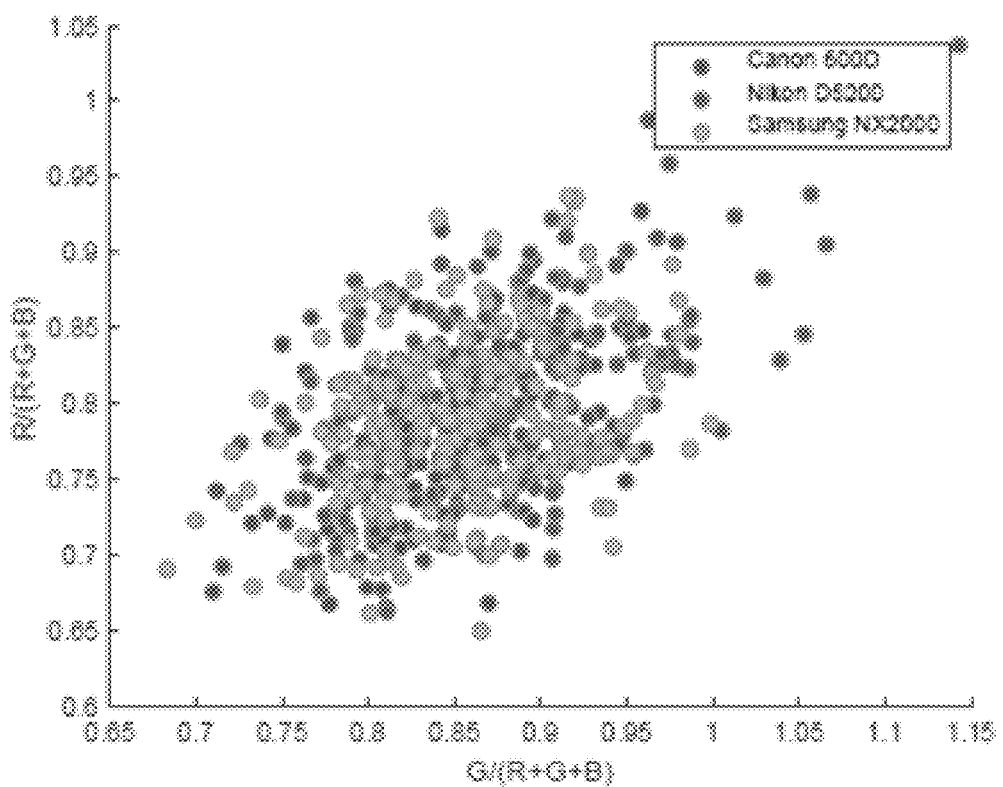
FIG. 6A shows an example chart of estimated illuminants of sensors that are bounded in a learned space, in accordance with the system of FIG. 1.
Figure 6B:
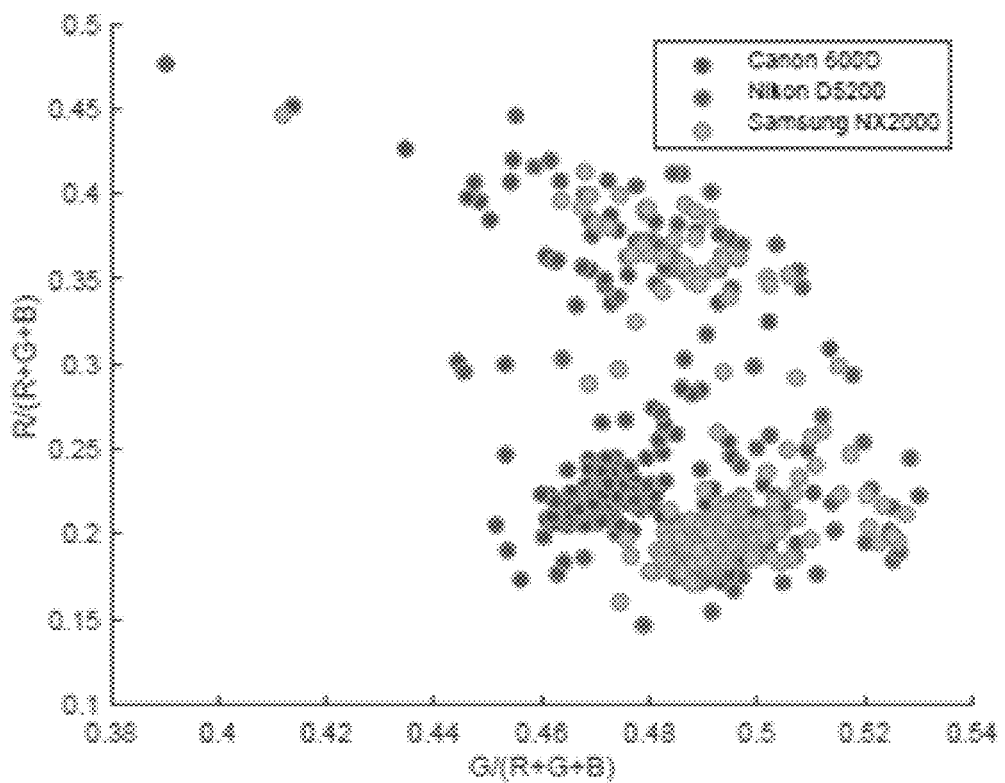
FIG. 6B shows an example chart of estimated illuminants after mapping back to the original raw-RGB space, in accordance with the system of FIG. 1.
Figure 6C:
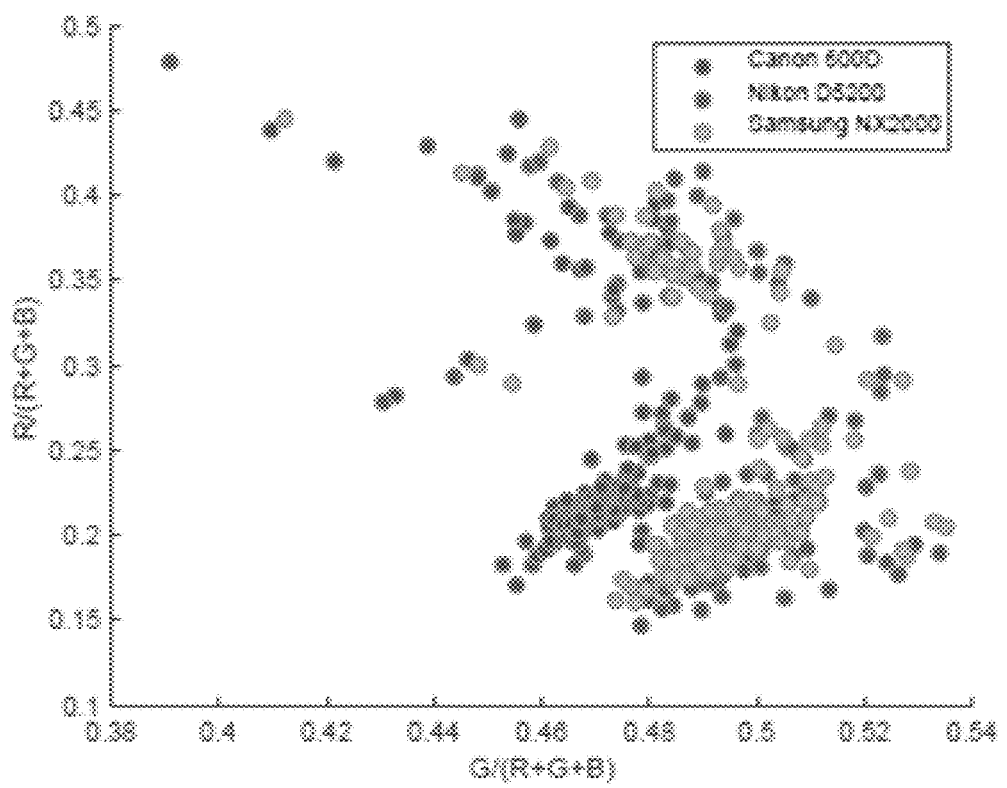
FIG. 6C shows an example chart of corresponding ground truth illuminants in an original raw-RGB space of each image, in accordance with the system of FIG. 1.

After training, the system 100 learns an image-specific matrix $\mathcal{M}$ that maps an input image taken by an arbitrary sensor to the learned space. FIGS. 6A to 6C shows examples of three different camera responses capturing the same set of scenes taken from a NUS 8-Cameras dataset, in accordance with an example experiment of the present embodiments conducted by the present inventors. As shown in FIG. 6A, the estimated illuminants of these sensors are bounded in the learned space. These illuminants are mapped back to the original raw-RGB sensor space of the corresponding input images using Equation (4). As shown in FIG. 6B and FIG. 6C, the final estimated illuminants are close to the ground truth illuminants of each camera sensor. FIG. 6B shows estimated illuminants after mapping back to the original raw-RGB space. This mapping is performed by multiplying each illuminant vector by the inverse of the learned image-specific mapping matrix (resulting from the sensor mapping network). FIG. 6C shows corresponding ground truth illuminants in the original raw-RGB space of each image.

The present inventors conducted example experiments to validate the advantages of the present embodiments. In the example experiments, cameras from three different datasets were used; which were: (i) NUS 8-Camera, (ii) Gehler-Shi, and (iii) Cube+ datasets. In total, there were 4,014 raw-RGB images captured by 11 different camera sensors. The example experiments used a leave-one-out cross-validation scheme for evaluation. Specifically, all images captured by one camera was excluded for testing and a model was trained with the remaining images. This process was repeated for all cameras. The present embodiments were also tested on a Cube dataset. In this example experiment, a trained model was used on images from the NUS and Gehler-Shi datasets, and excluded all images from the Cube+ dataset. The calibration objects (i.e., X-Rite color chart or SpyderCUBE) were masked out in both training and testing processes. Unlike other approaches that use three-fold cross-validation for evaluation, the present embodiments can perform validation using a testing camera sensor that was not used to train the machine learning models.

TABLE 1 shows results of the example experiments of angular errors on the NUS 8-Cameras dataset and TABLE 2 shows results of the example experiments of angular errors on the Gehler-Shi dataset. TABLE 3 shows results of the example experiments of angular errors on the Cube dataset and TABLE 4 shows results of the example experiments of angular errors on Cube+ dataset. TABLE 5 shows results of the example experiments of angular errors on the Cube+ challenge and TABLE 6 shows results of the example experiments of reproduction angular errors on the Cube+ challenge; the approaches are sorted by the median of the errors, as ranked in the challenge. TABLE 7 shows results of the example experiments of angular errors on the INTEL-TUT dataset.

TABLE 1

| Approach | Mean | Median | Best 25% | Worst 25% |
|---|---|---|---|---|
| White-Patch | 9.91 | 7.44 | 1.44 | 21.27 |
| Pixel-based Gamut | 5.27 | 4.26 | 1.28 | 11.16 |
| Grey-world (GW) | 4.59 | 3.46 | 1.16 | 9.85 |
| Edge-based Gamut | 4.40 | 3.30 | 0.99 | 9.83 |
| Shades-of-Gray | 3.67 | 2.94 | 0.98 | 7.75 |
| Bayesian | 3.50 | 2.36 | 0.78 | 8.02 |
| Local Surface Reflectance | 3.45 | 2.51 | 0.98 | 7.32 |
| 2nd-order Gray-Edge | 3.36 | 2.70 | 0.89 | 7.14 |
| 1st-order Gray-Edge | 3.35 | 2.58 | 0.79 | 7.18 |
| Corrected-Moment | 2.95 | 2.05 | 0.59 | 6.89 |
| PCA-based B/W Colors | 2.93 | 2.33 | 0.78 | 6.13 |
| Grayness Index | 2.91 | 1.97 | 0.56 | 6.67 |
| Color Dog | 2.83 | 1.77 | 0.48 | 7.04 |
| APAP using GW | 2.40 | 1.76 | 0.55 | 5.42 |
| Conv Color Constancy | 2.38 | 1.69 | 0.45 | 5.85 |

TABLE 1-continued

| Approach | Mean | Median | Best 25% | Worst 25% |
|---|---|---|---|---|
| Effective Regression Tree | 2.36 | 1.59 | 0.49 | 5.54 |
| Deep Specialized Net | 2.24 | 1.46 | 0.48 | 6.08 |
| Meta-AWB w 20 tuning images | 2.23 | 1.49 | 0.49 | 5.20 |
| SqueezeNet-FC4 | 2.23 | 1.57 | 0.47 | 5.15 |
| AlexNet-FC4 | 2.12 | 1.53 | 0.48 | 4.78 |
| Fast Fourier-thumb, 2 channels | 2.06 | 1.39 | 0.39 | 4.80 |
| Fast Fourier-full, 4 channels | 1.99 | 1.31 | 0.35 | 4.75 |
| Avg. result for sensor-independent | 4.55 | 3.50 | 1.26 | 8.98 |
| Avg. result for sensor-dependent | 2.44 | 1.66 | 0.50 | 5.79 |
| Present Embodiments | 2.05 | 1.50 | 0.52 | 4.48 |

TABLE 2

| Approach | Mean | Median | Best 25% | Worst 25% |
|---|---|---|---|---|
| White-Patch | 7.55 | 5.68 | 1.45 | 16.12 |
| Edge-based Gamut | 6.52 | 5.04 | 5.43 | 13.58 |
| Grey-world (GW) | 6.36 | 6.28 | 2.33 | 10.58 |
| 1st-order Gray-Edge | 5.33 | 4.52 | 1.86 | 10.03 |
| 2nd-order Gray-Edge | 5.13 | 4.44 | 2.11 | 9.26 |
| Shades-of-Gray | 4.93 | 4.01 | 1.14 | 10.20 |
| Bayesian | 4.82 | 3.46 | 1.26 | 10.49 |
| Pixels-based Gamut | 4.20 | 2.33 | 0.50 | 10.72 |
| PCA-based B/W Colors | 3.52 | 2.14 | 0.50 | 8.74 |
| NetColorChecker | 3.10 | 2.30 | — | — |
| Grayness Index | 3.07 | 1.87 | 0.43 | 7.62 |
| Meta-AWB w 20 tuning images | 3.00 | 2.02 | 0.58 | 7.17 |
| Corrected-Moment | 2.86 | 2.04 | 0.70 | 6.34 |
| APAP using GW | 2.76 | 2.02 | 0.53 | 6.21 |
| Effective Regression Tree | 2.42 | 1.65 | 0.38 | 5.87 |
| Fast Fourier-thumb, 2 channels | 2.01 | 1.13 | 0.30 | 5.14 |
| Conv Color Constancy | 1.95 | 1.22 | 0.35 | 4.76 |

TABLE 2-continued

| Approach | Mean | Median | Best 25% | Worst 25% |
|---|---|---|---|---|
| Deep Specialized Net | 1.90 | 1.12 | 0.31 | 4.84 |
| Fast Fourier-full, 4 channels | 1.78 | 0.96 | 0.29 | 4.62 |
| AlexNet-FC4 | 1.77 | 1.11 | 0.34 | 4.29 |
| SqueezeNet-FC4 | 1.65 | 1.18 | 0.38 | 3.78 |
| Avg. result for sensor-independent | 5.62 | 4.59 | 2.10 | 11.20 |
| Avg. result for sensor-dependent | 2.63 | 1.75 | 0.51 | 6.01 |
| Present Embodiments | 2.77 | 1.93 | 0.55 | 6.53 |

TABLE 3

| Approach | Mean | Median | Best 25% | Worst 25% |
|---|---|---|---|---|
| White-Patch | 6.58 | 4.48 | 1.18 | 15.23 |
| Grey-world (GW) | 3.75 | 2.91 | 0.69 | 8.18 |
| Shades-of-Gray | 2.58 | 1.79 | 0.38 | 6.19 |
| 2nd-order Gray-Edge | 2.49 | 1.60 | 0.49 | 6.00 |
| 1st-order Gray-Edge | 2.45 | 1.58 | 0.48 | 5.89 |
| APAP using GW | 1.55 | 1.02 | 0.28 | 3.74 |
| Color Dog | 1.50 | 0.81 | 0.27 | 3.86 |
| Meta-AWB (20) | 1.74 | 1.08 | 0.29 | 4.28 |
| Avg. result for sensor-independent | 3.57 | 2.47 | 0.64 | 8.30 |
| Avg. result for sensor-dependent | 1.60 | 0.97 | 0.28 | 3.96 |
| Present Embodiments | 1.98 | 1.36 | 0.40 | 4.64 |

TABLE 4

| Approach | Mean | Median | Best 25% | Worst 25% |
|---|---|---|---|---|
| White-Patch | 9.69 | 7.48 | 1.72 | 20.49 |
| Grey-world (GW) | 7.71 | 4.29 | 1.01 | 20.19 |
| Color Dog | 3.32 | 1.19 | 0.22 | 10.22 |
| Shades-of-Gray | 2.59 | 1.73 | 0.46 | 6.19 |
| 2nd-order Gray-Edge | 2.50 | 1.59 | 0.48 | 6.08 |
| 1st-order Gray-Edge | 2.41 | 1.52 | 0.45 | 5.89 |
| APAP using GW | 2.01 | 1.36 | 0.38 | 4.71 |
| Color Beaver | 1.49 | 0.77 | 0.21 | 3.94 |
| Avg. result for sensor-independent | 4.98 | 3.32 | 0.82 | 11.77 |
| Avg. result for sensor-dependent | 2.27 | 1.11 | 0.27 | 6.29 |
| Present Embodiments | 2.14 | 1.44 | 0.44 | 5.06 |

TABLE 5

| | Gray-World | Shades-of-Gray | 2nd-order Gray-Edge | PCA-based B/W Colors | 1st-order Gray-Edge | APAP using GW | Present Embodiments trained on NUS and Cube+ | Present Embodiments trained on NUS and Gehler-Shi |
|---|---|---|---|---|---|---|---|---|
| Mean | 4.77 | 4.99 | 4.82 | 4.65 | 4.62 | 4.30 | 3.76 | 3.82 |
| Median | 3.75 | 3.63 | 2.97 | 3.39 | 2.84 | 2.44 | 2.75 | 2.81 |
| Best 25% | 0.99 | 1.08 | 1.03 | 0.87 | 0.94 | 0.69 | 0.81 | 0.87 |
| Worst 25% | 10.29 | 11.20 | 11.96 | 10.75 | 11.46 | 11.30 | 8.40 | 8.65 |

In TABLE 1, TABLE 2, TABLE 3, and TABLE 4, the mean, median, best 25%, and the worst 25% of the angular error between our estimated illuminants and ground truth are shown. The best 25% and worst 25% are the mean of the smallest 25% angular error values and the mean of the highest 25% angular error values, respectively. As exemplified, the present embodiments performed better than all statistical-based approaches. The present embodiments obtained results on par with the sensor-specific approaches in the NUS 8-Camera dataset (TABLE 1) while maintaining sensor independence.

The example experiments further tested the present embodiments on the INTEL-TUT dataset, which includes DSLR and mobile phone cameras that are not included in the NUS 8-Camera, Gehler-Shi, and Cube+ datasets. TABLE 5 shows the obtained results by the approach trained on DSLR cameras from the NUS 8-Camera, Gehler-Shi, and Cube+ datasets.

Qualitative examples of the example experiments are shown in FIGS. 7A to 7D. FIG. 7A shows input raw-RGB images, FIG. 7B shows images after mapping images to a learned space, FIG. 7C shows images after correcting images based on estimated illuminants, and FIG. 7D shows images corrected by ground truth illuminants. For each example, the mapped image $I_m$ is shown in a learned intermediate space. In FIGS. 7A to 7D, the images were rendered in the sRGB color space by the camera imaging pipeline to aid visualization.

The present embodiments provide systems and methods for sensor-independent illuminant determination. Unlike other learning-based methods, the present embodiments are advantageously sensor-independent and can be trained on images captured by different camera sensors. Embodiments described herein can use an image-specific learnable mapping matrix that maps an input image to a sensor-independent space. In this way, the present embodiments can rely only on color distributions of images to estimate scene illuminants. Embodiments described herein can use a compact color histogram that is dynamically generated by an RGB-uv histogram block. As exemplified in the example experiments, the present embodiments achieve substantial results on images captured by new camera sensors that have not been used in the training process.

Although the invention has been described with reference to certain specific embodiments, various transformations thereof will be apparent to those skilled in the art. The scope of the claims should not be limited by the preferred embodiments, but should be given the broadest interpretation consistent with the specification as a whole.

The invention claimed is:

1. A computer-implemented method for determining an illuminant for an input image, the method comprising:
receiving the input image in raw-RGB format comprising an input color space;
determining a final illuminant by applying a result illuminant to the input color space, determining the result illuminant from a learned mapping space comprising:
receiving a plurality of training images in raw-RGB format;
generating the learned mapping space by passing a color distribution of each of the plurality of training images to a first machine learning model;
generating a plurality mapped images by applying the learned mapping space to each of the plurality of training images; and
determining the result illuminant by passing a color distribution of each of the plurality of mapped images as input into a second machine learning model; and
outputting the final illuminant.

2. The method of claim 1, wherein the color distribution of each of the plurality of training images comprises an input histogram generated from the respective training image, and wherein the color distribution of each of the plurality of mapped images comprises a mapped histogram generated from the respective mapped image.

3. The method of claim 2, wherein each of the input histograms and the mapped histograms comprise an RGB-uv histogram.

4. The method of claim 3, wherein the RGB-uv histogram comprises a first learnable parameter to control contribution of each color channel and a second learnable parameter to control smoothness of histogram bins.

5. The method of claim 1, wherein the learned mapping space is represented by a learnable 3×3 matrix and the result illuminant is represented by a vector.

6. The method of claim 5, wherein the final illuminant is a vector determined as a multiplication of an inverse of the learnable matrix and the result illuminant.

7. The method of claim 1, wherein the first learning model and the second learning model comprise a convolutional neural network comprising three convolutional (cony) and rectified linear units (ReLU) layers followed by a fully connected (FC) layer.

8. The method of claim 1, wherein the first learning model and the second learning model are jointly trained in an end-to-end manner using an adaptive moment estimation (Adam) optimizer.

9. The method of claim 1, wherein the first machine learning model and the second machine learning model use a recovery angular error between a ground truth illuminant for and the result illuminant as a loss function.

10. A computer-implemented method for determining a sensor-independent result illuminant, comprising:
receiving a plurality of training images in raw-RGB format;
generating the learned mapping space by passing a color distribution of each of the plurality of training images to a trained first machine learning model;
generating a plurality mapped images by applying the learned mapping space to each of the plurality of training images;
determining the result illuminant by passing a color distribution of each of the plurality of mapped images as input into a second machine learning model; and
outputting the result illuminant.

11. A system for determining an illuminant for an input image, the system comprising one or more processors and a data storage, the one or more processors in communication with the data storage device and configured to execute:
an input module to receive the input image in raw-RGB format comprising an input color space;
a sensor mapping module to generate a learned mapping space by passing a color distribution of each of a plurality of training images received by the input module to a first machine learning model;
an illuminant determination module to determine a result illuminant by passing a color distribution of each of the plurality of mapped images as input into a second machine learning model, the mapped images generated by applying the learned mapping space to each of the plurality of training images;
a final illuminant module to determine a final illuminant by applying the result illuminant to the input color space; and
an output module to output the final illuminant.

12. The system of claim 11, further comprising a histogram module to generate an input histogram as the color distribution of each of the plurality of training images, and to generate a mapped histogram as the color distribution of each of the plurality of training images.

13. The system of claim 12, wherein each of the input histograms and the mapped histograms comprise an RGB-uv histogram.

14. The system of claim 12, wherein the learned mapping space is represented by a learnable 3×3 matrix and the result illuminant is represented by a vector.

15. The system of claim 14, wherein the final illuminant is a vector determined as a multiplication of an inverse of the learnable matrix and the result illuminant.

16. The system of claim 11, wherein the first learning model and the second learning model comprise a convolutional neural network comprising three convolutional (cony) and rectified linear units (ReLU) layers followed by a fully connected (FC) layer.

17. The system of claim 11, wherein the first learning model and the second learning model are jointly trained in an end-to-end manner using an adaptive moment estimation (Adam) optimizer.

18. The system of claim 11, wherein the first machine learning model and the second machine learning model use a recovery angular error between a ground truth illuminant for and the result illuminant as a loss function.

* * * * *